US006978152B1

(12) United States Patent
Yamaashi et al.

(10) Patent No.: US 6,978,152 B1
(45) Date of Patent: Dec. 20, 2005

(54) DIGITAL BROADCASTING SYSTEM FOR PROVIDING PROGRAM AND DATA TO A VEHICLE

(75) Inventors: Kimiya Yamaashi, Hitachi (JP); Masato Horita, Hitachi (JP); Yukihiro Kawamata, Hitachi (JP)

(73) Assignee: Hitachi, Ltd., Tokyo (JP)

(*) Notice: Subject to any disclaimer, the term of this patent is extended or adjusted under 35 U.S.C. 154(b) by 282 days.

(21) Appl. No.: 09/635,449

(22) Filed: Aug. 10, 2000

(30) Foreign Application Priority Data

Aug. 11, 1999 (JP) ................................ 11-227255

(51) Int. Cl.[7] ................................................ H04B 7/00

(52) U.S. Cl. .................... 455/526; 455/345; 455/414.1

(58) Field of Search ................................ 455/566, 345, 455/456, 457, 414, 419, 410–412, 517, 558, 455/557, 426, 99, 95, 66, 575, 351, 3.02, 455/456.1, 414.1, 412.1, 426.1, 66.1, 575.1, 455/74, 526; 701/200, 213, 211, 208; 73/178 R; 340/989, 990, 993; 342/454, 457; 709/219, 709/328, 329; 370/529, 527, 476, 342, 335

(56) References Cited

U.S. PATENT DOCUMENTS 5,063,610 A 11/1991 Alwadish
5,239,540 A 8/1993 Rovira et al.
5,600,573 A 2/1997 Hendricks et al.
5,694,120 A * 12/1997 Indekeu et al. ........ 340/825.44
5,715,243 A * 2/1998 May ...................... 340/825.44
5,781,246 A * 7/1998 Alten et al. .................. 725/40
5,850,444 A 12/1998 Rune
5,900,825 A * 5/1999 Pressel et al. .............. 340/905
5,991,690 A * 11/1999 Murphy ...................... 701/211
6,091,956 A * 7/2000 Hollenberg ................. 455/456
6,381,465 B1 * 4/2002 Chern et al. ................ 455/466

FOREIGN PATENT DOCUMENTS

EP 0817413 1/1998
GB 2307628 10/1996
JP 8-87234 4/1996
JP 8-195690 7/1996
JP 10-153440 6/1998

* cited by examiner

*Primary Examiner*—Eliseo Ramos-Feliciano
(74) *Attorney, Agent, or Firm*—Mattingly, Stanger, Malur & Brundidge, P.C.

(57) ABSTRACT

Ordinary data groups and index information indicating data names and memory locations of broadcasted data are transmitted in multiplex mode from the data broadcasting station 101, and received by the onboard terminal 103 and/or the information service station 104 through the data distribution part 102. The onboard terminal 103 detects the information which it does not hold by referring to the index information, and presents a list of data names at the onboard display part 133. The service station 104 stores separately the data groups and the index information provided from the broadcasting station 101, and in response to the download request from the onboard 103, it examines whether the required data is located in SS memory part 147 by referring to the index data, and captures the required data from external memory locations defined in the index information if the required data is not stored.

11 Claims, 9 Drawing Sheets

FIG. 7(a)

CUSTOMER DATA MANAGEMENT TABLE 601

| | | |
|---|---|---|
| 611 | ONBOARD TERMINAL NO. | |
| 612 | USER NO. | |
| 613 | USER NAME | |
| 614 | VEHICLE NO. | |
| 615 | RENEWAL DATE | |
| 616 | CREDIT NO. | |
| 617 | USER KEY | |
| 618 | ACCESS KEY | |
| 619 | ACCESS PASSWORD | |
| 620 | DOWNLOAD PUBLIC KEY | |
| 621 | NUMBER OF REGISTERED DATA | |

FIG. 7(b)

REGISTERED DATA MANAGEMENT TABLE 603

| DATA NO. | DATA NAME | Ver. | ACCESS CODE | DATA POINTER |
|---|---|---|---|---|
| | | | | |
| | | | | |
| | | | | |
| | | | | |
| | | | | |
| | | | | |
| 631 (321) | 632 (322) | 633 | 634 | 635 |

DIGITAL BROADCASTING SYSTEM FOR PROVIDING PROGRAM AND DATA TO A VEHICLE

BACKGROUND OF THE INVENTION

The present invention relates to a digital broadcasting system for providing the program and data to the mobile station on a vehicle with digital broadcasting, and to an information service station and a mobile terminal for storing and distributing the program and its related data which the mobile object can not received.

At present, as for the information system used on the vehicle, map navigation systems come into wide use in the country of the inventors. An upgrading the software of the map navigation system, however, requires technical knowledge, and it is difficult for general users to upgrade the software. In the countries outside out country, the onboard navigation systems are designed with a general purpose OS, and various programs are executed on it. A map navigation system is under developing not as a dedicated terminal like a conventional map navigation system but as an onboard computer system designed with emphasis on expandability.

An Intelligent Transportation System (ITS) is under discussion as a next generation onboard information system. An information service to the moving vehicle is provided actively in ITS. Under the present circumstance, only transient traffic information such as traffic jam status and expected travel time is practically in service.

In order to meet the user's needs mentioned above and transfer information efficiently to plural targets, such a way that the user can service the data and software of the navigation system in the onboard terminal by broadcasting the data though digital broadcasting and/or FM broadcasting is introduced (Japanese Patent Application Laid-Open Number 8-87234 (1996), and Japanese Patent Application Laid-Open Number 8-195690 (1996)). By integrating the network represented by GPS and Internet and the data broadcasting, a navigation system enabling various services including upgrading of the map data at the onboard terminal with a computer is proposed (Japanese Patent Application Laid-Open Number 10-153440 (1998)).

As described above, there are some proposals found here and there which enables to register the new version of the software and control its versions in the onboard terminal by using the multiplexed data broadcasting. However, as the current information transmitted from the broadcasting station is transient (or intermittent), the user can not obtain his or her necessary data when the data broadcasting is not on air. The data distribution part of the satellite and beacon systems has a limited transmission capacity. For example, the communication satellite for digital television has 20 to 30 Mbps per 1 channel. When trying to transmit massive data and programs in such a circumstance, it is impossible to transfer all the data in a short period. In trying to repeat data broadcasting including past data, the transmission efficiency is reduced, which results in the failure of providing various data services.

Owing to this circumstance, even when the user needs a new program for the onboard terminal or tries to upgrades the version of the data in order to obtain the services provided for the onboard terminal, the transmission data is reluctantly transmitted from the data distribution parts including the satellite and beacon systems. This means that it is difficult for the user to obtain his or her necessary data when the user needs it. On the other hand, as the electric power is not applied to the onboard terminal while the vehicle stops, the data can not received. As a result, there is such a problem that, whether the required broadcasting data has been broadcasted can not be even recognized, and that the data can not be obtained.

What is proposed in Japanese Patent Application Laid-Open Number 8-87234 (1996) is a system that the data is stored in plural repeater stations with broadcasting and the onboard terminal of the individual vehicle picks up the data from its neighboring repeater station if required. However, if the name of the broadcasting data which could not be received at the onboard terminal is not recognized by the onboard terminal, the user can not even request what he or she asks to receive from the repeater station.

So far, there is no consideration in the conventional proposals for the onboard terminal to know what data was broadcasted in past and what data could not be received. Searching a mechanism for informing easily the name of the broadcasted data and so on without increasing the amount of data is a critical problem. If the name of the data (and preferably the location of the data) which should be transmitted again can be found also in the repeater station, the efficiency in the transmission processing and the storage processing can be increased and the service provided in response to the request for the broadcasting data name from the onboard terminal can be realized.

SUMMARY OF THE INVENTION

The present invention provides a digital broadcasting system and a mobile terminal allowing to revise software and its versions easily at the mobile terminal by using a multiplex data broadcasting, and provides an information service station for storing data by relaying the digital broadcasting contents and for distributing the mobile terminal requesting those contents.

The present invention to attain the object described above is characterized as a digital broadcasting system having a digital broadcasting transmission apparatus for broadcasting data groups and a digital broadcasting receive apparatus for receiving said data groups directly or indirectly through the data distribution part, in which a transmission means for multiplexing and broadcasting (for example, with time division multiplex) ordinary data to be broadcasted as present programs and index data defined as identification information of data broadcasted in past or to be broadcasted in future. The digital broadcasting described above is established by surface wave digital broadcasting or satellite digital broadcasting.

The index data include a data ID (number and/or name) of the data broadcasted in past or to be broadcasted in future, and a remote memory location from which the data can be downloaded. The number of data ID includes an original number and a revision number of data versions and, in addition, a download charge.

The digital broadcasting transmission apparatus transmits the ordinary data and the index data with their distinctive identifiers added, and the digital broadcasting receive apparatus identifies the ordinary data and the index data separately among the received data groups of digital broadcasting by referring to the identifiers.

The digital broadcasting receive apparatus has a judge means for determining whether the original data are downloaded in the apparatus itself or not by referring to the data ID in the received index data.

In case that the digital broadcasting receive apparatus is a mobile terminal, the mobile terminal displays index data of the original data not downloaded yet, and has a download request means for allowing to select the necessity for downloading. In this case, the mobile terminal also has a transmission means for putting out the contents requested by the download request means, and a receive means for receiving the digital broadcasting contents and the download data selectively. The transmission means puts out the requested contents with a public-key used exclusively for the individual user or terminal being added.

In case that the digital broadcasting receiver is an information relay apparatus (hereinafter referred to as "information service station"), the information relay apparatus has a data receive means for receiving the digital broadcasting contents, a data memory means for storing the ordinary data and the index data separately among the received data group, an input means for accepting a download request, a data management means for referring to an index data corresponding to the requested data in case that the data memory means does not contain the requested data, and directing the requested data to be retrieved from the remote memory location specified by the index data, and a distribution means for transmitting the download data to the requester. In addition, the apparatus has also a security management means for encrypting the download data by using a cipher key obtained from the requester.

The information service station transmits a verification information for verifying the fact that the requester obtains the distributed information along with the download data, and acknowledges the response to the verification information, and processes a billing operation based on the download charge.

The digital broadcasting receive apparatus forms a critical part of the digital broadcasting system of the present invention as well as provides an invention having progressively and novelty generic to the broadcasting receive apparatus itself. Other features, not mentioned above, for the mobile terminal and the information service station as embodiments of this receive apparatus are shown below.

The mobile terminal of the present invention for achieving the above described object as an apparatus embedding a computer executing plural installed software programs has a communication means for receiving digital broadcasting contents, an input means for accepting an operation input by the user, an information memory means for storing the programs and related data, a display means for displaying the execution result of programs and the operation screens, and a control means for managing the program and data captured from the communication means and the input means, in which the information memory means stores the management information including the information ID's independently of the programs and data.

When the control means receives the index data including data ID's (number and/or name) of the data already broadcasted or to be broadcasted in the future along with the ordinary data including the programs and related data as the time division multiplex data of the digital broadcasting contents through the communication means, the control means extracts the data ID's of the data not yet downloaded among the data covered by the index data by referring to the management data stored in the information memory means, and only the data with the extracted data ID's are displayed with the display means.

The input means has an external media input means allowing IC cards or any type of external memory media to be inserted, and when a designated memory media is inserted and a download operation is requested by the input means, the management data stored in the information memory means are read out and stored in the inserted memory media. The designated memory media is, for example, an IC card or a magnetic card, which stores the mobile terminal number and/or user number, and the cipher key for download operation.

The communication means has a receive channel corresponding to the transmission from the download requester as well as a receive channel for the digital broadcasting, in which those channels are switched in responsive to the insert operation of the designated memory media. This switching operation is activated with the download request by the input means or the insert operation of the IC card and so on.

The information service station of the present invention for achieving the above described object stores the data groups received in the digital broadcasting and distributes the data in responsive to the download request from the mobile terminal, which obtains the individual cipher key for each mobile terminal and encrypts the data requested for download by the cipher key and sends the encrypted data to the requester.

The management data including data ID's (number and/or name) of the stored data and the internal memory locations are stored, and the data ID's and index data including the external data memory locations for the data already broadcasted or to be broadcasted in the future are stored as the management data. The cipher key is obtained from the output of the transmission means of the mobile terminal as described above.

In turn, in case that the information service station obtains the cipher key from the IC card for the mobile terminal described above, the data ID of the data already downloaded by the mobile terminal and stored in the IC card and the management information are compared with each other, and the data already downloaded or the version of the data are displayed selectively.

In case that the download request is issued for the data or the version of the data displayed so far, the download charge is further displayed so as to enable to verify the download operation. In case that the data requested for download are not located in the internal memory location, the requested data are captured from the external memory location indicated by the index data contained in the requested data and downloaded onto the requester.

According to the present invention as described above, as the mobile terminal can receive the data groups of the programs and the related data and the individual index data (identification information for tabulating the data groups) of the data groups already broadcasted or to be broadcasted in the future, both in the time division multiplex digital broadcasting contents, the data which are not obtained by the mobile terminal can be easily recognized by referring to the index data, and the download request can be issued by specifying the designated data name.

According to the present invention, as the information service station can receive and stores temporarily the data groups and the index data in the time division multiplex digital broadcasting contents, and distributes them in responsive to the download request from the mobile terminal, the data which the mobile terminal failed to receive due to its disability can be downloaded anytime. Thus, by means that the information service stations used as relay stations are distributed geometrically, the digital broadcasting station does not need to communicate directly to the individual users, and various type of data can be efficiently transmitted and the data which the mobile terminal failed to receive can be delivered at a proper timing.

BRIEF DESCRIPTION OF THE DRAWINGS

FIG. 7 is a data structure diagram showing an example of data in the IC card.

DETAILED DESCRIPTION OF THE PREFERRED EMBODIMENTS

Now, the preferred embodiment of the present invention is described in detail by referring to the attached figures. It is difficult for users to obtain their necessary data and programs at their preferential time from the data distribution part with the onboard terminal in the prior art. In order to solve this problem, there is such a solution that the data distribution part is so configured as to enable to communicate interactively with the onboard terminal and accept requests from the onboard terminal. There are 10000000 or more vehicles in Japan, and thus, it is difficult to broadcast massive data to the individual vehicles simultaneously. Though it is possible in practice to make the onboard terminal connect to the Internet through PDC interface of cellular phone systems and download data, it is not easy for public users to install data and programs, and revise their versions.

In the mobile terminal information service system of the present invention, an information service station for storing programs and data served to the onboard terminal through digital broadcasting and distributing (selling) them to the onboard terminal is provided. The information service station stores massive programs and data which can not be loaded only on a single onboard terminal, and downloads them onto the onboard terminal in responsive to the request by the user through radio wave communication in the similar manner to the purchase of gasoline for the vehicle. It will be appreciated that the user can obtain his or her necessary data at his or her preferential time even when the data distribution part does not distributes those data in real time.

Figure 1:
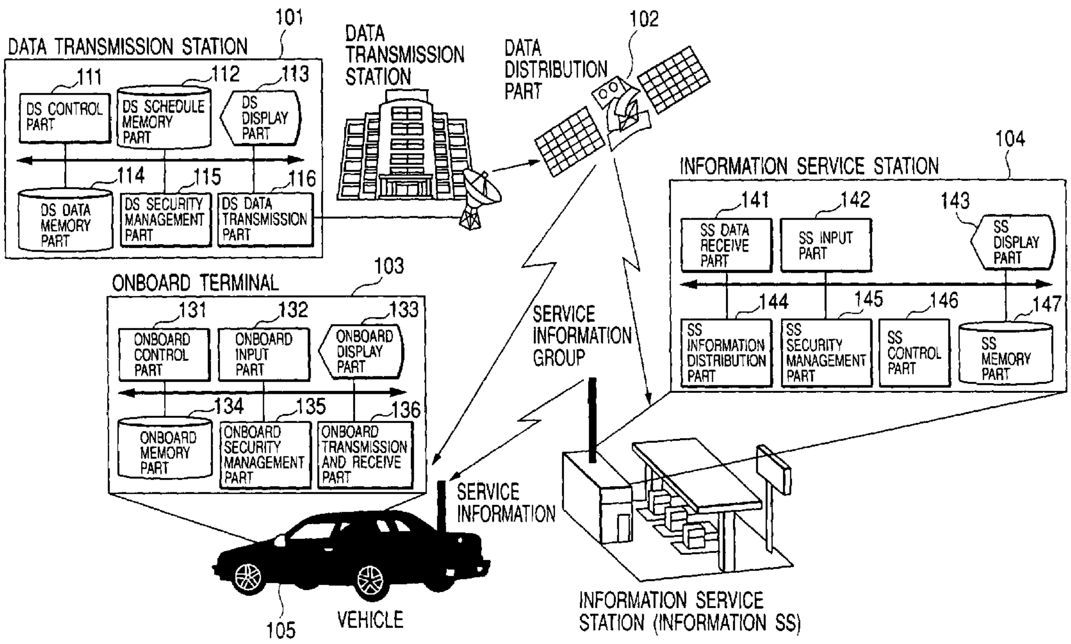
FIG. 1 is a schematic diagram of a mobile information service system of one embodiment of the present invention.

FIG. 1 illustrates a schematic diagram of a mobile information service system of this embodiment. The mobile information service system is composed of major three parts. The onboard terminal 103 is mounted on a mobile body such as vehicle 105 for providing service information to people getting in the vehicle. The data transmission station 101 distributes the information (display data and programs for the onboard terminal) directed to the onboard terminal 103 to the ground station (onboard terminal 103 and information service station 104) through the data distribution part 102 such as satellite and vehicle-to-road communication path (beacon) on the road. The information service station 104 sells the data (map data, music data and so on) used in the onboard terminal 103 and the programs (navigation programs and so on) used in the onboard terminal 103, and updates the version of data and programs.

The data transmission station 101 is composed of DS control part 111 for controlling totally the transmission station, DS memory part 114 for storing the information to be distributed including the program used in the onboard terminal 103, the program difference information used for version upgrade, the data (map information, shopping information and so on) used by the programs in the onboard terminal 103, DS schedule memory part 112 for storing the transmission timing (transmission schedule) for those service information, DS security management part for encrypting data for distributing data with security protection, and DS data transmission part 116 for modulating and transmitting encrypted data on a designated radio wave.

DS data control part 111 reads a time schedule stored in DS schedule memory part 112 defining what information of program files and data files in DS data memory part 114 should be sent at each time slot. The time schedule is examined with finer time mesh and the information file to be sent is searched, and the information file to be sent is extracted from DS data memory part 114 at a designated time before the information file is to be transmitted, and the information file to be sent is encrypted with a designated cipher key at DS security management part 115, and the encrypted transmission information and the transmission time are coupled together and made sent to DS data transmission part 116. DS data transmission part 116 searches a pair of the encrypted transmission information and the transmission time sent from DS control part 111, and when the scheduled transmission time is detected, then DS data transmission part 116 modulates the encrypted transmission information scheduled to be sent at this time at a designated frequency and sends it in radio wave forms.

The data distribution part 102 is composed of a data receive part, a data amplifier part and a data transmission part (not shown in the figure.) The encrypted transmission information sent from the data transmission station 101 is received and modulated at the data receive part, and the modulated signal is amplified by the data amplifier part, and then, the data transmission part modulates again the amplified signal at a designated frequency and resends it in radio wave forms.

The onboard terminal 103 is composed of an onboard control part 131 for controlling totally the onboard terminal, an onboard transmission and receive part 136 for receiving the transmission information (programs and data used in the onboard terminal) from the data distribution part 102 and the information service station 104, a onboard security management part 135 for managing the overall security, an onboard input part 132 for capturing the input operation by the user and programs and data through an IC card and removable media such as CD-ROM and DVD into the onboard terminal 103, an onboard memory part 134 for storing programs and data used in the onboard terminal from the onboard input part 132 and the onboard transmission and receive part 136, and an onboard display part 133 for displaying the execution result of programs (for example, car navigation screens) and operation screens to the user.

The programs and data used in the onboard terminal are read out from the removable media driver such as CD-ROM and DVD in the onboard input part 132 and stored as program files in the onboard memory part 134 by the command for requesting the execution of the program install in the media from the onboard input part 132 to the onboard control part 131. By means that the user requests the execution of the program files from the onboard input part 132, the onboard control part 131 extracts the program file corresponding to the program requested to be executed by the user from the onboard memory part 134 and executes it.

The programs and data used in the onboard terminal to be stored in the onboard memory part 134 are obtained from the information transmitted as a radio wave from the data distribution part 102 and/or the information service station 104. The onboard transmission and receive part 136 always detects a radio wave having a designated frequency like digital TV, and extracts a encrypted transmission information from the data distribution part 102 and/or the information service station 104, and when a set of logical information is established, then it is transferred from the onboard transmission and receive part 136 to the onboard security management part 135. The onboard security management part 135 holds a key for encoding the encrypt for the encrypted transmission information received at the onboard transmission and receive part 136, and decodes the encrypted transmission information into the original transmission information with this key and transfers it to the onboard control part 131. If the onboard security management part 135 can not decode the encrypted transmission information, (that is, it has no encoding key), the received information is abandoned.

The onboard memory part 131 holds temporarily the decoded transmission information in the onboard memory part 134. As the area for storing the decoded transmission information inside the onboard memory part 134 is limited, if the volume of the decoded transmission information exceeds the size of this area, older one of the decoded transmission information already stored in this area is deleted sequentially according to its access history, And furthermore, the onboard control part 131 displays a small icon on the onboard display part 133 the label of which is named after the name of the program captured by the onboard transmission and receive part 136. With this user interface, the user can be made recognize that a new information is arrived and stored in the onboard memory part 134.

The information service station 104 is composed of SS control part 146 for controlling totally the station, SS data receive part 141 for receiving the encrypted transmission information from the data distribution part 102 and so on, SS memory part 147 for storing the received data, SS input part 142 for capturing the user input through an IC card and/or a touch panel into the information service station 104, SS information distribution part 144 for distributing the information in SS memory part 147 to the onboard terminal 103 of the vehicle 105 through a radio wave in responsive to the user input, SS security management part 145 for encoding the information from SS data receive part 141 and encrypting the information in SS memory part 147 to be distributed from SS information distribution part 144, and SS display part 143 for displaying the execution status of the information service station 104 and its user-operation menu.

SS control part 146 inside the information service station 104 captures the download target and the encryption code for permitting the download operation in responsive to the user input (which may be allowed through an IC card as described later) from SS input part 142. A list of software available for download for the user is displayed on SS display part 143, and the user is allowed to select the data he or she wants to download. When the user specifies the data he or she wants to download, SS control part 146 extracts the specified data from SS memory part 147, and the data is encrypted by the encryption code assigned to the individual download operation defined as described above, and the encrypted data is modulated at a predefined frequency for the individual download operation and distributed to the onboard terminal 103 by SS information distribution part 144.

As the onboard transmission and receive 136 in the onboard terminal 103 is staying in the download operation under the control of the onboard input part 132, it does not detect a radio wave from the data distribution part 102, but detects a radio wave having a frequency assigned for the information service station 104, and thus, can receive the data from SS information distribution part 144. In addition, the data received at the onboard transmission and receive part 136 is decoded by the onboard security management part 136 as described above and stored in the onboard memory part 134.

As described above, by using the information service station 104, the onboard terminal 103 can download its necessary information anytime when the user requests it. However, as the information transmission rate (band width) of the artificial satellite and the on-road communication apparatus (beacon) provided as the data distribution part 102 is limited, it is difficult to transmit all the requested data all the time. In addition, it is difficult for the onboard terminal and/or the information service station as a receiver to receive all the channel (corresponding to a single frequency or a single channel in case that a single frequency is used and multiplied in a time division mode like digital TV.) This means that the onboard terminal 103 can not obtain the information name required for allowing the user to specify the download information only by the above described architecture. In addition, the information service station can not store efficiently various information for the onboard terminal and provide the information service to be distributed.

In the system of this embodiment, the name of data already broadcasted and to be broadcasted in the future and the index information related to their memory locations are transmitted in a time division multiplex so as to be accessible and downloadable from the remote sites.

Figure 2A:
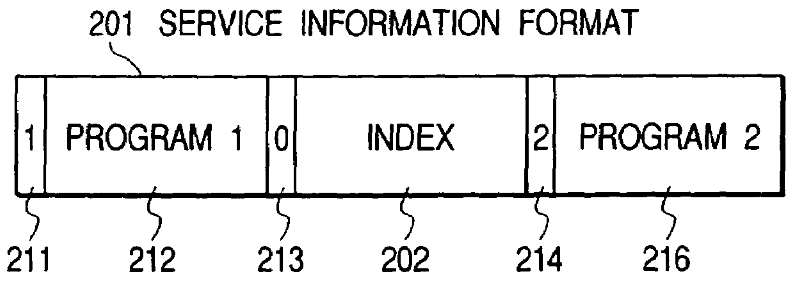
FIG. 2 is a structure diagram of broadcast data to be multiplexed from a data transmission station.
Figure 2B:
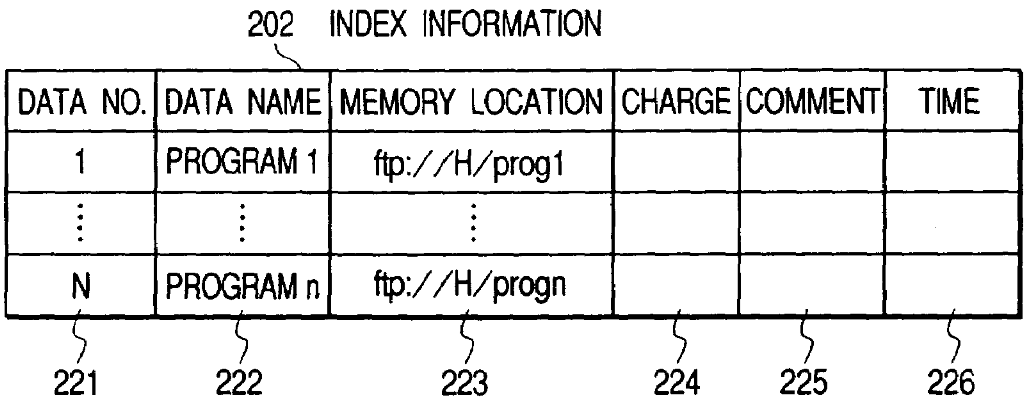
Figure 2C:
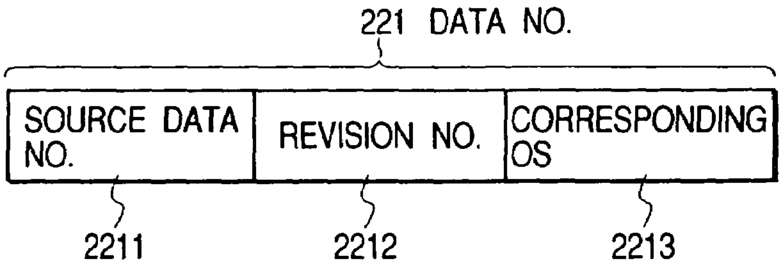

FIG. 2 illustrates data formats of broadcast data in this embodiment. As shown in FIG. 2(*a*), in addition to the ordinary data 212 and 216 broadcasted at the present time, the index information 202 is inserted in a time division multiplex. As shown in FIG. 2(*b*), in the index information 202, the memory location 223 for the individual data is defined in terms of FTP (File Transfer Protocol) file directory, and its data No. 221 and data name 222 are also described. It also includes the amount of money charged to the user for the individual download operation, the comment 225 for the individual data and the broadcast time 226 of the data, which are stored in the data memory part 114 of the data transmission station 101.

In the schedule data in DS schedule memory part 112, an information for transmitting the index information 202 as well as programs and data used in the onboard terminal is defined. DS control part 111 transmits data in obedience to this index information. For example, in case that there is such a schedule data defined in DS schedule memory par 112 that the program (1) 212 is transmitted at first, the index information 202 is transmitted next, and then the program (2) 216 is transmitted, DS control part 111 extracts the data related to the program (1) from DS data memory part 114 at first, and this data is encrypted by DS security part 115 and then transferred to DS data transmission part 116. Next, DS control part 111 extracts the index information 202 from DS data memory part 114, and this data is encrypted also by DS security part 15 and then transferred to the data transmission part 116. This procedure is applied similarly to the program (2).

On the other hand, DS data transmission part 116 applies sequentially frequency modulation to the encrypted data transmitted from DS control part 111 and transmits it. And thus, the index information 202 is inserted between the ordinary data 212 and 216 broadcasted at the moment in the data supplied from the data transmission station as shown in FIG. 2(*a*). At this time, the data transmission part 111 adds the identifiers 211, 213 and 214 to the data and transmits them. This identifier contains concretely a data number 221 represented in 62 bits. A number 0 is assigned in the identifier 213 for the index information 202. Thus, whether the transmit data contains the index information 202 or the ordinary data can be recognized easily by the receive side.

As described above, by means of multiplex broadcasting of the current broadcasting program as well as the index information 202 with a fewer transmission volume, the user can recognize the existence of his or her necessary programs and/or data and their location. The user can obtain his or her necessary information not stored in the information service station 104 owing to its circumstances or not broadcasted yet by accessing through the network to the location directed by the memory location 223 in case that the information is not stored in the information service station 104.

FIG. 2 illustrates a format of the data No. in the index information. The version of programs and data executed in the onboard terminal 103 is upgraded with time. Therefore, aversion upgrade of data is not definitely recognized only by means of marking serial numbers to programs and data sequentially as the broadcast programs are distributed on schedule. In this embodiment, the data No. 221 is defined with a revision No. 2212 coded in 16 bit as well as a source data o. 2211 coded in 32 bit. In addition, a associated-OS No. 2213 coded in 12 bit is allowed to be assigned in order to handle a single program title associated with different OSs.

With this format, the information service station 104 and/or the onboard terminal 103 can recognize the source data and its version associated with the received data only by referring to the data No. 221. In case that the version upgrade data of the source data is transmitted as difference data, all the difference data associated with the source data can be obtained by using its source data No. 2211 and associated-OS No. 2213 as search keys.

Next, the operation of the onboard terminal in this embodiment is described. As the onboard terminal 103 of the mobile information service system receives the information from the data transmission station 101 as the data and its index information 202 broadcasted in the present time thorough the data distribution part 102, the user can understand what programs have been already broadcasted and what programs are to be broadcasted in the future, and even what programs he or she failed to watch.

Figure 3:
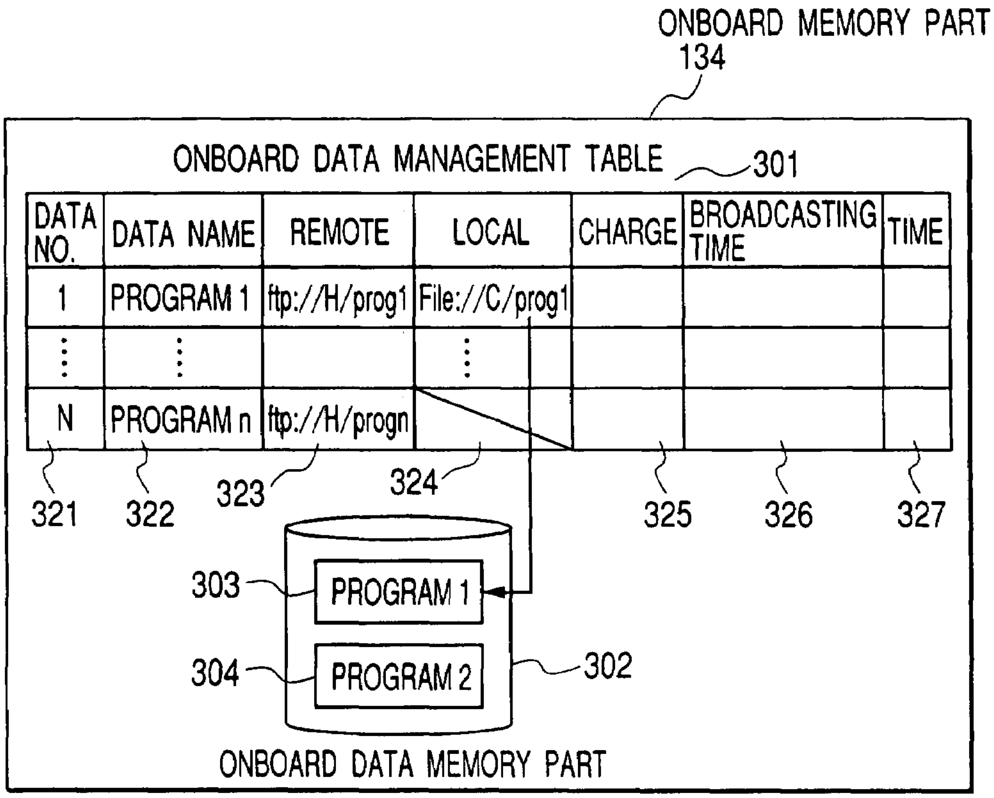
FIG. 3 is an explanatory drawing of memory and management operations of receive information on the onboard terminal.

FIG. 3 illustrates a structure of memory and management operations of the receive information at the onboard terminal. The onboard memory part 134 is composed of the onboard data management table 310 and the onboard data memory part 302. The onboard control part 131, when it receives the information originated from the data distribution part 102 from the onboard transmission and receive part 136, decodes the received information with the decode key in the onboard security management part 135, and decomposes it into parts each corresponding to the individual data, and stores them in the onboard memory part 134. At the same time, the following procedures are applied to the onboard data management table 301.

As in the case with the index information 202, what stored on the onboard data management table 301 include the data No. 321 and the data name 322 uniquely assigned to the individual data, the remote file name 323 directing the remote location in which the data files are stored, the local file name 324 with which the data file is stored locally inside the onboard terminal 103, and the amount of money charged for the individual download operation, the broadcast time 326 of the individual data and the access time 327 by the user.

Every time when the onboard control part 131 receives the individual data, it confirms the identifiers 211, 213 and 214. When the index information 202 with its identifier 0 is received, by making a comparison between the data No. 221 and the data No. 321 on the onboard data management table 301 currently stored, in case that it is proved to detects an arrival of new data, a data No. 221, a data name 222, a remote file name 223, a charge 224, a comment 225 and a broadcast time 226 of the new data are extracted from the index information 202 and added on the onboard data management table 301. At this time, NIL is put into the corresponding local file name 324 and the time 327.

In case that the index of the received data is not 0 (for receiving the data), the onboard terminal 131 searches the onboard data management table 301 by using the data No. 221 in the received data for the search key, and whether there is a local file corresponding to the data No. 321 is judged. In case that there is a local file name 324 (not NIL), the received data is abandoned. On the other hand, in case that the local file name 324 is NIL, the received data is made stored in the onboard data memory part 302 as data, and the file name (generated from the data name) stored in the onboard data memory part 301 is made stored as the local file name 324 in the onboard data management table 301. In addition, the time when the data is stored is made stored as the time 327 in the onboard data management table 301.

In case that the empty area of the onboard data memory part 302 is so small that the received data can not be stored, the onboard control part 134 deletes the data already stored and reserves the memory area on the onboard data memory part 302 for storing the next received data. At this time, the onboard control part 134 refers to the time 327 in the onboard data management table 301, and deletes older data in order of their time stamps in order to reserve the memory area for the new download data. Then, the received data is made installed. The time when the user down load the individual data is recorded as the time 327. Thus, the older data in the onboard data memory part 302 to which the user accessed in the past are deleted in order of access history.

Figure 4:
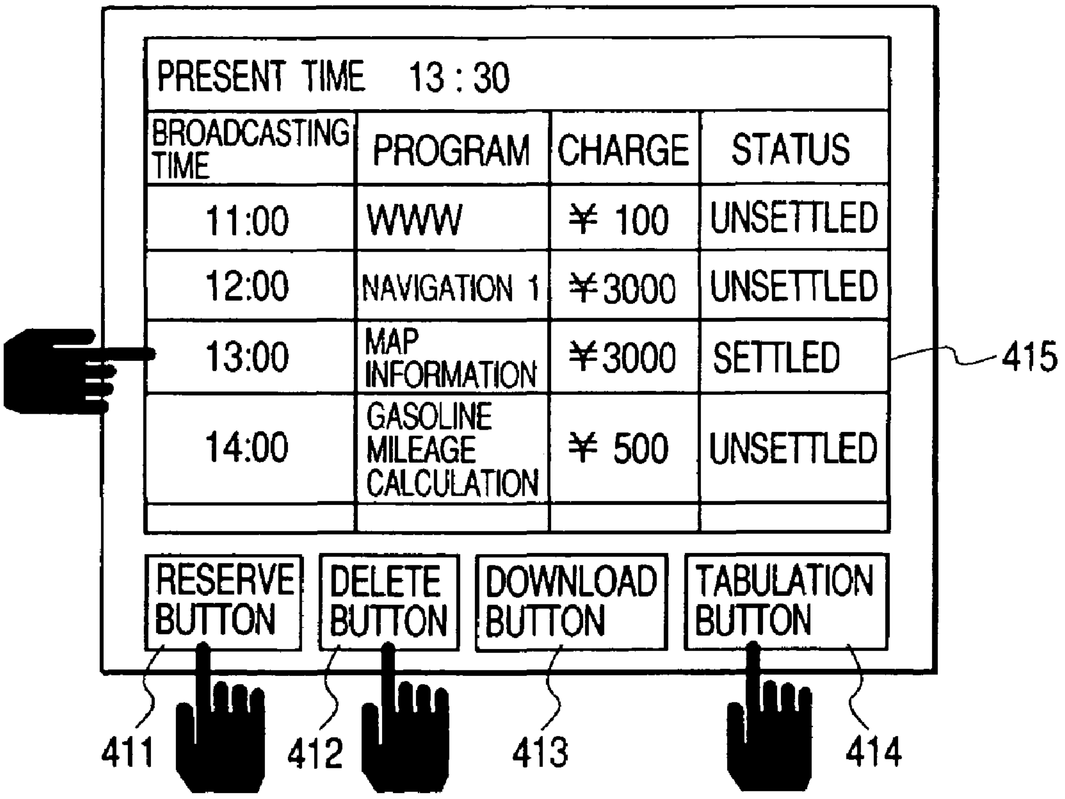
FIG. 4 is an explanatory drawing showing an example of screen image on the onboard terminal.

FIG. 4 illustrates an example of the screen image of the onboard terminal. In responding to the user's selection of the data tabulation button 414 from the onboard input part 132 of the onboard terminal 103, a data table 415 including a data broadcasting menu as shown in FIG. 4 is displayed. When the data tabulation button 414 of the onboard input part 132 is selected by the user, the onboard control part 131 searches the onboard data management table 301, and recognizes the individual data status (for data No 321 judged from data No. 221, for name 322 judged from data name 222, for broadcast time 326 judged from broadcast time 226, and whether the individual data is already downloaded or not judged with local 324 being NIL or not, respectively), and then displays the data table 415 shown in FIG. 4. The data already downloaded and the data not downloaded yet are classified with their status "settled" or "unsettled", which can be recognized explicitly by the user. With this representation, the user can understand what data has been downloaded and what data has not been downloaded yet.

The user can delete, download and reserve the data in the onboard terminal 103 by using the buttons of the onboard input part 132 shown in FIG. 4. For example, suppose that the user select the data already received shown in the data table 415. If the user select the data deletion button 402 next, similarly as in the case of the data overflow described above, the onboard control part 131 deletes the substantial data (for example, the program 303) of the selected data, and initializes the local file 324 and the time 327, both corresponding to this substantial data in the onboard data management table 301 so as to be NIL. In case that the user selects the data already received and selects the download button 413, he or she can download the selected data from the information service station 104 as described later.

Next, the structure and operation of the information service station 104 are described. At first, the method for storing and controlling the information in the information service station is described. The information service station 104 receives the information from the data transmission station 101 through the data distribution part 102. SS control part 14 receives the information transmitted by the data distribution part 102 at SS data receive part 141, and then encodes the information with the decoding key in SS security management part 145, and decomposes the encoded information into parts each corresponding to the individual data and stores them into SS memory part 47.

Figure 5:
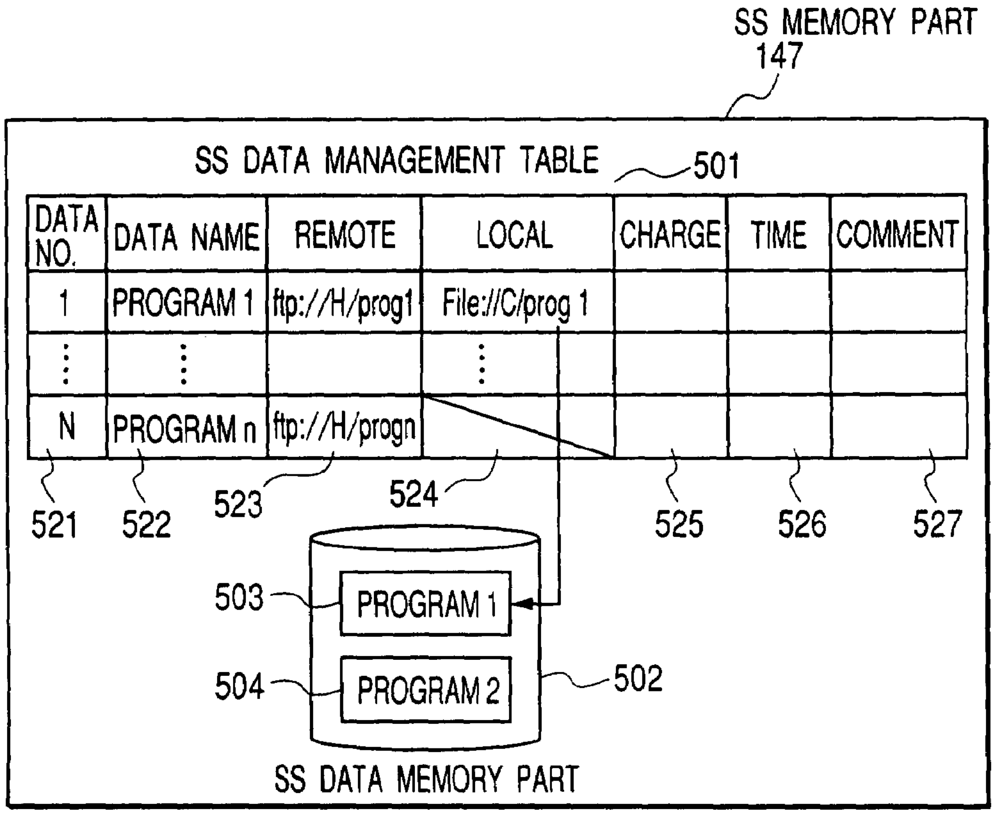
FIG. 5 is an explanatory drawing of memory and management operations of received information at the information service station.

FIG. 5 illustrates the structure of SS data memory part. SS memory part 147 is composed of SS data management table 501 and SS data memory part 502. As in the case of the index information 202, what are stored in SS data management table 501 include the data No. 512 and the data name, both uniquely assigned to the individual data, the remote file name 523 directing the remote location in which the data files are stored, the local file name 524 with which the data file is stored locally inside the information service station 104, and the amount of money charged for the individual down load operation, the user's access time 526 and the comment 527 for the individual data.

When SS control part 146 receives the index information 202, it compares the data No. 221 with the data No. 521 presently stored in SS data management table 501, and if it is judged that there is a new data, SS control part 146 extracts the data No. 221, the data name 222, the remote file name 223, the charge 224 and the comment 225 of the new data from the received data and adds those to SS data management table 501. At this time, the entities for the corresponding local file name 524 and time 525 are set to be NIL.

When SS control part 146 receives the data, it searches SS data management table 501 by using the data No. 221 in the received data for the search key, and whether there is a local file corresponding to the data No. 221 (=521) is judged. In case that there is a local file name 524 (not NIL), the received data is abandoned. On the other hand, in case that the local file name 524 is NIL, the received data is made stored in SS data memory part 502 as data(for example, program (1) 503), and the file name (generated from the data name) stored in SS data memory part is made stored as the local file name 524 in SS data management table 501. In addition, the time when the data is stored is made stored as the time 526 in SS data management table.

In case that the empty area of the onboard data memory part 502 is so small that the received data can not be stored, SS control part 146 deletes the data already stored and reserves the memory area on SS data memory part 502 for storing the next received data. At this time, SS control part 146 refers to the time 526 in SS data management table 501, and deletes older data in order of their time stamps in order to reserve the memory area for the new download data. The time when the user down load the individual data is recorded as the time 526. Thus, the older data in SS data memory part 502 are deleted in order of history with reference to the time 526.

Figure 6:
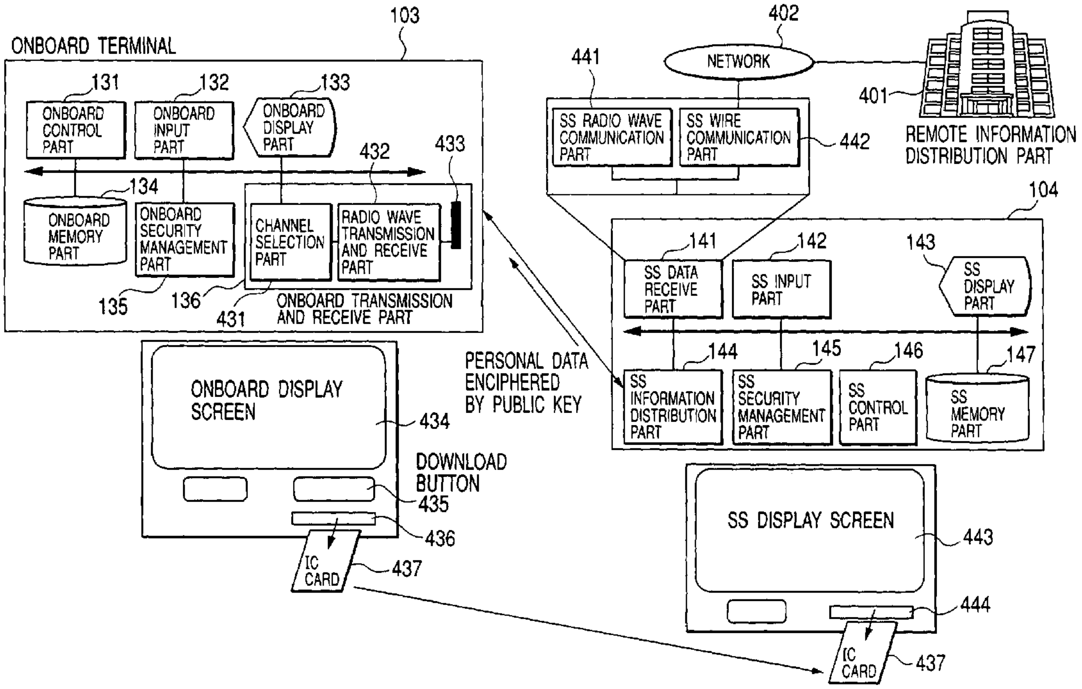
FIG. 6 is a system block diagram including structures required for download added on the information service station and the onboard terminal.

Next, methods for downloading data from the information service station 104 and data maintenance are described. FIG. 6 illustrates a structure for downloading the data from the information service station to the onboard terminal.

As shown in FIG. 6, the onboard input part 132 of the onboard terminal 103 has a download button 435 and an IC card reader 436. The onboard transmission and receive part 136 is composed of a channel selection part 431 for selecting a frequency with which an information the user requires is provided and/or a channel provided by multiplying a designated frequency in a time division mode like digital TV, a radio wave receive part 432 for receiving a radio wave, and an antenna 433 for transmitting and receiving the radio wave.

When the user inserts the IC card 437 into the IC card reader 436, all the information in the IC card 437 are stored in the onboard memory part 134. At this time, if the user pushes the download button 435, the IC card 437 is ejected from the IC card reader 436. At the same time, the onboard control part 131 of the onboard terminal 103 is switched into the process in download mode. That is, the onboard control part 131 temporarily saves the channel number currently selected by the user in the onboard memory part 134. The onboard control part 131 requests the channel selection part 431 to switch the communication channel established in advance to the information service station 104 into receive channel mode. With this operation, the onboard terminal 103 can receive an information transmitted from the information service station 104.

FIG. 7 illustrates a data structure inside the IC card. IC card 437 has a customer data management table 601 and a registration data management table 603, and an onboard terminal No. 611, a user No. 612, a vehicle No. 614, a credit No. 616, a download public-key 620 and so on are registered in the customer data management table 601. On the other hand, the registration data management table 603 administrates the data representing the contents of programs and data groups currently downloaded in the onboard terminal 103 such as a data No. 631 (321) and a data name 632 (322).

On the other hand, as shown in FIG. 6, SS input part 142 of the information service station 104 has an IC card reader 444 and a touch screen 443 on SS display part. SS data receive part 141 has SS wire communication part 442 for communicating an information through the network 402 as well as SS radio wave communication part 441 for communicating an information with a radio wave from the data distribution part 102 as described so far. The network 402 is connected to the remote distribution part 401 represented as a memory location (remote file name) 223 defined in the index information 202, and storing the source data from the data distribution part 102 and distributing the data in response to the request by the information service station 104.

Figure 8:
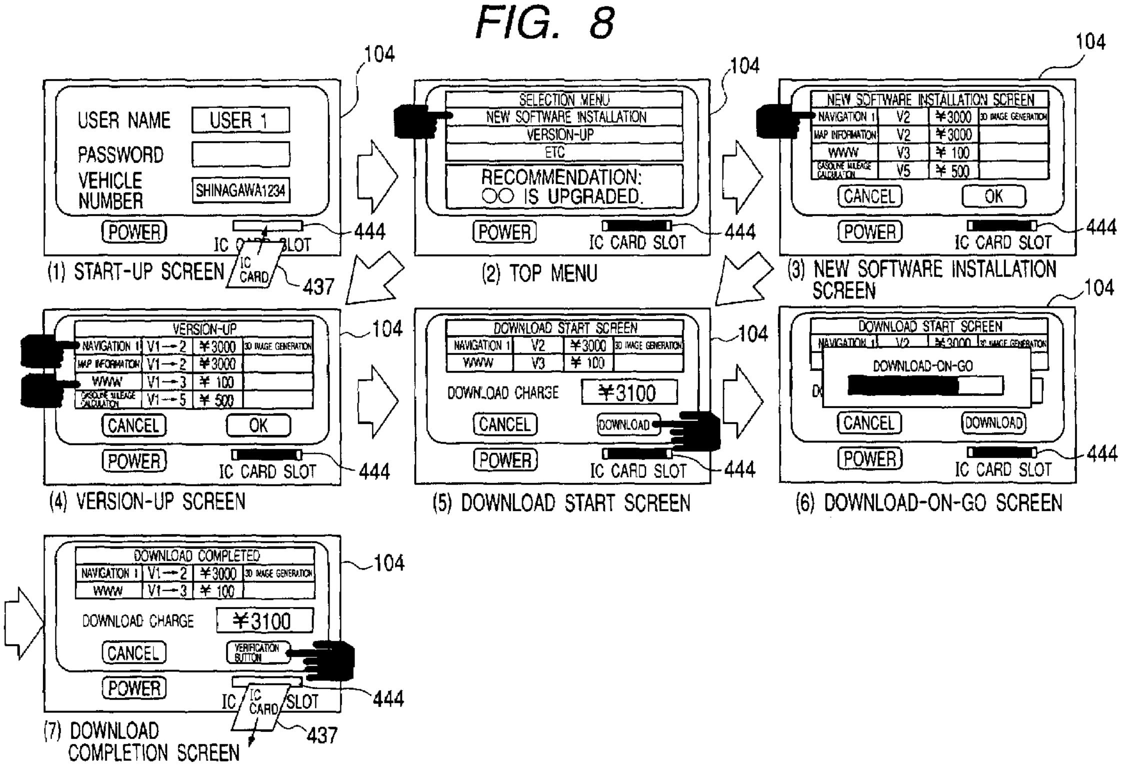
FIG. 8 is a transition diagram of operation screens when servicing information from the information service station.

FIG. 8 illustrates procedures (1) to (7) for screen operations when providing an information from the information service station to the onboard terminal. As shown above, when the IC card 437 ejected from the onboard terminal 103 with its mode switched to a download mode is inserted into the IC card reader 444 of the information service station 104 by the user, a procedure for providing an information by the information service station 104 is started.

When the IC card 437 is inserted into the IC card reader 444 of SS input part 142, its insertion event is reported to SS control part 146. SS control part 146 receiving this report extracts the user name 613, the vehicle No. 614 and the password 619 from the customer data management table 601 stored in the IC card 437 thorough the IC card reader 444. A start-up screen (1) generated by using the user name 613 and the vehicle No. 614 is displayed on SS display part 143, and the user's input of his or her password is expected. When the user inputs his or her password requested on the start-up screen (1) from SS input part 142, SS control part 146 compares the input password and the password 619 extracted from the IC card 437. If those passwords are matched each other, the top menu (2) is displayed. If those passwords are not matched each other, the start-up screen (1) is displayed again and the user is requested to input his or her password.

At the top menu (2), a selection menu including "install new software", "version-up" and soon is displayed. In addition, recommendation announces to the user may be displayed. In order to prepare those display contents, SS control part 146 refers to the registered data-management table 603 representing the contents of programs and data groups stored in the IC card (403) and currently downloaded in the onboard terminal 103. the source data No. 2211 and the revision No. 2212 are obtained in the data No. 321 on the registered data management table. In order to judge whether there is any data with its version being able to be upgraded found in the data in the onboard terminal 103, SS data management table 501 in the information service station 104 is searched by using the individual source data No. 2211 for the search key. If there found a new data in SS data management table 501 with its version higher than the version of the data in the onboard terminal 103, the information indicating that "the version of program is upgraded" in the onboard terminal 103 is displayed and the user is advised to download its new version.

When the user touches the menu indicating "new software installation" on the top menu (2) with his or her finger, the coordinate of the position at which he or her specifies on the touch panel 433 at SS input 142 is captured. SS control part 146 judges from the input coordinate that the menu indicating "new software installation" is selected, and a new software installation screen (3) is displayed in the following procedure.

SS control part 146 all the data other than the data with their data No. 321 read out from the IC card 437 and downloaded in the onboard terminal 103 are searched among the data with their source data No. 2211 corresponding to the data No. 521 stored on SS data management table 501 in the information service station 104. In addition, the searched data are sorted for the individual source data No. 2211, and the largest revision No. 2212 is found in the sorted data, and thus, program names with their revision numbers as candidates to be installed newly are displayed at SS display part (143) as shown in the screen (3.)

Collecting the individual data numbers 521 having an identical source data No. 2212 and referring to the charge 525 (which is amount of money charged for upgrading a version from its previous version for the individual data. A base charge for the program is defined for the charge for the version 0.) in SS data management table 501, the total amount of money for the data from the first version 0 to the current version is displayed for the total charge at SS display part 143.

In case that a comment 527 is stored for the latest version for the source data No. 2211 in SS data management table 501, SS control part 146 displays its comment on the comment field on the screen (3). In the illustrated example, a comment indicating "3D image generation" is displayed on the comment field for "Navigation 1" as the first software.

The user can select his or her necessary software only by touching the title of the software on the new software installation screen (3), that is, through the touch screen 443 on SS display part 143. SS control part 146 identifies the software to be installed on the basis of the position on which the user touch. For example, in case of the screen (3), it is assumed that the user selects the title of "Navigation 1". As a matter of course, the user is allowed to select plural titles of software. When the user selects plural titles of software and presses "OK" button, SS input part 142 recognizes from the position on the touch panel that the user presses "OK" button, and displays a list of selected titles of software as shown in the download start screen (5).

In order to display the screen (5), SS control part 146 searches SS data management table 501 with the title of software selected by the user, and calculates the individual download charge for the individual software and their total charge by the above described method. In the illustrated example, "navigation 1 is ¥3,000", "WWW is ¥100" and those total charge is ¥3,100 is displayed on SS display part 146. When the user selects "Download" button, a download-on-go screen (6) is displayed next.

When the user selects "Download" button on the screen (5), SS control part 146 refers to SS data management table 501, and obtains the memory locations for designated software (for example, "Navigation 1" and "WWW".) At this time, in case that the memory location is already stored in SS memory part 147, the local memory location 524 can be obtained. On the other hand, in case that the memory location has not stored yet in SS memory part 147 or that the program content has not broadcasted yet, the local memory location can not obtained, and hence, SS control part 146 can obtain the remote memory location 523 broadcasted as the index information 202. In case that there is an information to be downloaded at the local memory location 524, SS control part 146 extracts an information to be downloaded from a designated location (with a designated file name) at SS data memory part 502.

On the other hand, in case that there is an information to be downloaded at a remote site, SS control part 146 directs SS data receive part 141 to get the information from the location 523 defined in SS data management table 501. SS data receive part 141, receiving the receive request and the remote site location from the SS control part 146, obtains the information to be download from the remote site, for example, the remote information distribution part 401 through the network 402 with FTP protocol at SS wire communication part 442 inside SS data receive part 141. The source data already broadcasted as well as the source data to be broadcasted are ordinarily stored in the remote information distribution-part 401 so as to be ready for distribution.

And furthermore, SS control part 146 downloads the file received from the remote site and/or the local file into the user's onboard terminal 103. When SS control part 146 obtains the information specified by the user so as to be downloaded from SS memory part 147 and/or SS data receive part 141, a verification and administration number (64 bit fixed-length record) uniquely assigned to the data is added onto the header of the data and encrypted with a download public-key 620 read out from the IC card 437 at SS security management part 145. The encrypted information is modulated with a predefined download frequency and broadcasted at SS information distribution part 144. In order to present the progress status of the download operation, SS control part 146 generates such a slide bar as the screen (6) with the amount of data to be downloaded and the amount of data already downloaded and displays it on SS display part 143.

As the channel selection part 431 in the onboard transmission and receive part 136 is tuned to the download frequency in the onboard terminal 103, the onboard terminal 103 receives the broadcasted data through the antenna 433, the radio wave receive part 432 and the channel selection part 431 when the broadcast program is broadcasted from SS information distribution part 144 of the information service station 104. The onboard control part 131 decodes the downloaded encrypted information at the onboard security management part 135 by using the user's download cipher key 620. In case that the cryptanalysis is successfully completed, the onboard control part 131 judged that the downloaded data is for its onboard terminal and stores the downloaded data in the onboard memory part 134, and return its terminal number and verification management number indicating that the download data is surely received to the information service station 104 through the onboard transmission and receive part 136.

The information service station 104 receives a verification information (including the number of the onboard terminal downloading the data and its verification management number) from SS information distribution part 144, and transfer it to SS control part 146. SS control part 146 examines whether the verification management number is identical to that of the information when downloading, and judges that the download operation is completed if the onboard terminal No. 611 in the IC card matches the transmitted onboard terminal number. In case that those does not matches each other or that there is no reply for verification in a definite period of time, an error message is displayed on SS display part 143, and the screen (5) is got back to display. When completing the download operation, SS control part 146 displays the download completion screen (7) on SS display part 143.

When the user selects the verification key on the screen (7), SS control part 146 judges that the download operation was successfully completed, and executes the accounting operation, and then, adds the contents of the download information to the registered data management table 603 of the IC card 437 and ejects the IC card 437 from SS input part 444.

When the user return the ejected IC card 437 to the onboard terminal 103, the onboard control part 131 judges that the download operation is completed, and then, sets the previous channel number stored in the onboard memory part 131 into the channel selection part 431 in order to switch back to the memorized channel before the downloading operation.

In case that the user select "Version Upgrade" on the top menu (2) shown in FIG. 8 with his or her finger, SS input part 142 captures the coordinate of the input position on the touch panel 443. SS control part 146 judges from the input coordinate that the menu indicating "Version Upgrade" is selected, and a version-up screen (4) is displayed in the following procedure.

SS control part 146 finds all the same data as the data with their data No. 631 (321) read out from the IC card 437 and downloaded in the onboard terminal 103 among the data corresponding to the data No. 521 stored on SS data management table 501 in the information service station 104. In addition, the found data are sorted for the individual source data No. 2211, and collecting the individual data numbers 521 having an identical source data No. 2212 and referring to the charge 525 (which is amount of money charged for upgrading a version from its previous version for the individual data. A base charge for the program is defined for the charge for the version 0.) in SS data management table 501, the total amount of money for the data from the first version 0 to the current version is displayed for the data download charge at SS display part 143.

As shown in the screen (4), the program name, the version number and the charge of the data as candidates for version upgrade. In addition, in case that a comment 527 is stored for the latest version for the source data No. 2211 in SS data management table 501, SS control part 146 displays its comment on the comment field. For example, a comment indicating "3D image generation" is displayed on the comment field for "Navigation 1" as the first software.

The user can select his or her necessary software only by touching the title of the software on the version upgrade screen (4). SS control part 146 identifies the software to be installed on the basis of the position on which the user touch. For example, in case of the screen (4), it is assumed that the user selects the titles of "Navigation 1" and "WWW". As a matter of course, the user is allowed to select plural titles of software. When the user selects plural titles of software and presses "OK" button, SS input part 142 recognizes from the position on the touch panel that the user presses "OK" button, and displays a list of selected titles of software as shown in the screen (5). Later screen operations (5) to (7) and the operation of the service station 104 are the same as those in case for installing new software.

In the above embodiment, what is described is such a method that, by means that the user visits the information service station 104 and operates interactively the screens in the information service station 104, he or she downloads his or her necessary information into the onboard terminal 103. As for another method, it is allowed that the user can download his or her necessary information directly from the information service station 104 by operating the onboard terminal 103 while he or she is staying inside the vehicle. A method for downloading an information by means that the user operates the onboard terminal 103 is described below.

Figures 9A, 9B, 9C:
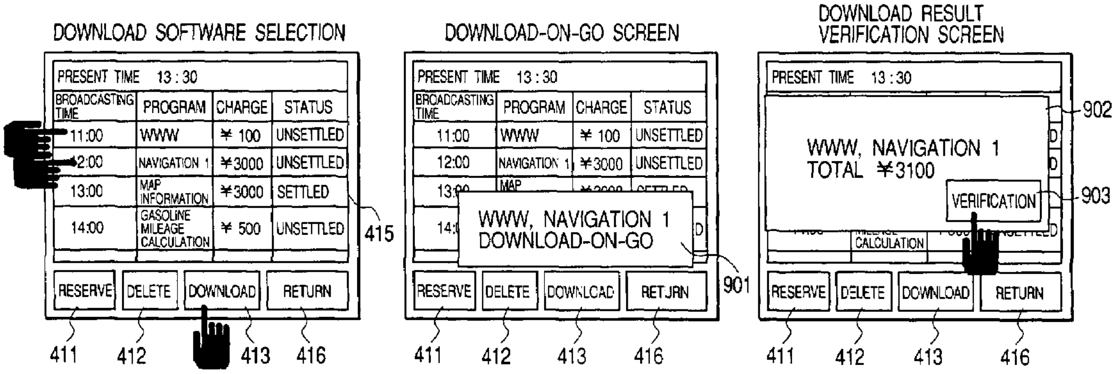
FIG. 9 is an explanatory drawing of operation screens when downloading information directly from the onboard terminal.

FIG. 9 describes screen operations for downloading a necessary information directly from the onboard terminal. In FIG. 9(*a*), when the user selects the data already downloaded (for example, WWW and Navigation 1) on the operation screen including the broadcast menu list shown in FIG. 4, and specifies the download button 413, the onboard terminal 103 and the information service station 104 executes the following procedures and downloads the designated data.

When the user selects the download button 413 at the onboard input part 132, the onboard control part 131 directs the channel selection part 431 through the onboard transmission and receive part 135 to switch to the dedicated download channel. In addition, the onboard control part 131, by using this dedicated channel, a communication request for asking whether there is an information service station 104 being able to respond in the neighborhood, Broadcasts the public-key 620 for the onboard terminal stored in the onboard security management part 135 and the onboard terminal number 611 of the onboard control part 131 with a radio wave through the radio wave transmission and receive part 432.

When the information service station 104 in the neighborhood receives the request from the onboard terminal 103 at SS radio wave communication part 441 of SS data receive part 141, in case that the information service station in the neighborhood is occupied by the execution of the service for another user, the information service station encrypts the data indicating that the information service station is busy and the unique number of the information service station in SS control part 146 with the open key 620 received from the onboard terminal 103 and transmits the encrypted information from SS information distribution part 144. On the other hand, in case that the information service station in the neighborhood is not occupied by the execution of the service for another user, the information service station encrypts the message indicating that the information service station is ready to serve for the user and the unique number of the information service station in SS control part with the open key 620 received from the onboard terminal 103 and transmits the encrypted information with a radio wave from SS information distribution part 144.

The onboard terminal 103 requesting the communication receives the information from several information service stations 104 at the onboard transmission and receive part 36, and encodes the received information with its own public-key 620, and then initiates the communication with the information service station n104 transmitting the message indicating that its service is available. The onboard terminal 103 encrypts the credit card No. 616 used in payment in the onboard control part 131 and/or the IC card 437 and the data name (for example, WWW and Navigation 1) of the data which the user specifies on the screen shown in FIG. 9(*a*) for download by using the open key provided by the information service station 104 with which the onboard terminal wants to communicate, and encrypts again the unique number of the information service station the user want to use with the public-key 620 of the onboard terminal 103 and transmits it.

When SS control part 141 of the information service station answering the message indicating that it can be used for service receives the data from the onboard terminal 103 in responsive to the communication request from the onboard terminal, at first, SS control part decodes the received data with the public-key 620 which is obtained from the onboard terminal 103 with a radio wave previously, and next, judges whether the unique number of the information service station in the encoded data is that for the information service station 104 itself, and if it is not so, SS control part does not proceed the further procedure. On her other hand, If this unique number is that for the information service station itself, SS control part further decodes the data from the onboard terminal 103 with its own public-key, and extracts the credit number 616 provided from the onboard terminal 103 and the data name which the user wants to download.

SS control part 146 searches SS data management table 501 by the title of the software the user selects, and calculates the download charge of the individual software and the total charge by using the method described above. And then, an information indicating such a user's selection defined as "Navigation 1 is ¥3000"1, "WWW is ¥100" and the total charge is ¥3100 is encrypted with the public key of the onboard terminal and transmitted to the onboard terminal 103.

The onboard terminal 103 decodes the data from the information service station 104 with the public-key 620 and displays a download-on-go message shown in FIG. 9(*b*).

And further more, when the information service station 104 receives the request for download from the onboard terminal 103, SS control part 146 refers to SS data management table 501 and obtains the memory locations for the software corresponding to be downloaded (for example, "Navigation 1" and "WWW".) A this time, in case that the software to be downloaded is already stored in SS memory part 147, the local memory position 524 can be obtained. In case that the local memory position 524 can not be obtained, the remote memory position 523 broadcasted as index information 202 can be obtained.

In case that there is an information to be downloaded at the local memory location 524, SS control part 146 gets out an information to be downloaded from a designated location (file name) in SS memory part 504. On the other hand, n case that there is an information to be downloaded at a remote site, SS control part 146 directs SS data receive part 141 to get the information at the remote memory location 523. When SS data receive part 141 receives a remote location 523 and a data receive request from SS control part 146, SS data receive part obtains, from its internal SS wire communication part 442, the information to be downloaded from a remote location (remote information distribution part 401) with FTP protocol through the network 402.

Then, SS control part 146 downloads the file received from the remote site and/or the file stored locally onto user's onboard terminal 103. When SS control part 146 obtains the information specified by the user so as to be downloaded from SS memory part 147 and/or SS data receive-part 141, it adds a verification and administration number (64 bit fixed-length record) uniquely assigned to the data to be downloaded onto the header of the data and SS security management part 145 encrypts it with a download public-key 620 provided from the onboard terminal. In addition, the encrypted information is modulated in a predefined download frequency and broadcasted at SS information distribution part 144.

In the onboard terminal 103, as the channel selection part 431 of the onboard transmission and receive part 136 is turned for the download frequency, when broadcasting from SS information distribution part 144 at the information service station 104 begins, the onboard terminal receives the data broadcasted through the antenna 433, the radio wave receive part 432 and the channel selection part 431. The onboard control part 131 decodes the downloaded information by using its own cipher key at the onboard security management part 135. At this time, if decoding is successfully completed, the onboard control part judges that the downloaded information is the data directed to itself and stores the data into the onboard memory part 134, and replies its own onboard terminal number and a verification and administration number indicating that the designated data is surely received to the information service station 104 through the onboard transmission and receive part 136.

The information service station 104 receives the verification information (the onboard terminal number and the verification and management number for the download operation) from SS information distribution part 144, and transfers it to SS control part 146. SS control part 146 checks whether the verification and management number is identical to the information provided when downloading, and in case that the onboard terminal number 611 transmitted from the onboard terminal 103 coincides the transmitted onboard terminal number, it concludes that the download operation is completed, and transmits a termination report to the onboard terminal 103. In the onboard terminal 103, when completing the download operation, the onboard control part 146 displays the download completion screen as shown in FIG. 9(*c*) on the onboard display part 143.

When the user selects the verification key 903 on the download completion screen (c) with the onboard input part 13, the onboard control part 146 reports the user's verification to the information service station 104. The information service station 104 recognizes the successful download operation with the receipt of this user's verification, and applies the charge to the credit number 616 from the onboard terminal 103, and terminates the communication with the onboard terminal 103. The onboard control part 131 of the onboard terminal 103 also recognizes the termination of the download operation when selecting the verification key 903, and sets the previous channel number stored in the onboard memory part 131 to the channel selection part 431.

According to the present invention, as the program currently broadcasted and information groups including its related data, and the individual data name and index data of the information group already broadcasted and to be broadcasted in the future are broadcasted as digital broadcasting data in multiplex broadcasting, it will be appreciated that a list of data which can not be received by the mobile terminal can be viewed. With this approach, there is such an effect that the data name and its version to which the user can not access easily can be easily obtained, and the user can request to download his or her necessary data among the available data. In addition, as the volume of the index data is smaller enough compared with the source data, various data service can be established without reducing the transmission efficiency of the data broadcasting station.

According to the present invention, as the information service station which receives and stores the data group and index, and distribute them in responsive to the user' request stored can be realized, there is such an effect that the user does not need to memorize all the broadcasting data and the user can download his or her necessary data when he or she needs them.

As the information service station encrypts the data to be downloaded with the cipher key obtained through the communication or the IC card provided by the user, there is such an effect that the download data is not listened to the unintended people and the user can download the data with security from the information service station through radio wave.

What is claimed is:

1. A digital broadcasting system comprising:

a digital broadcasting transmission apparatus for broadcasting data groups; and a digital broadcasting receive apparatus for receiving said data groups;

wherein the digital broadcasting data groups contain in a multiplexed form:

ordinary data to be broadcasted as present programs;

identification data for identifying the data broadcasted in the past or that is to be broadcasted in the future; and index data multiplexed to ensure that said identification data for identifying the data broadcasted in the past or that is to be broadcasted in the future is associated with the time of broadcast and the storage location permitting downloading of the broadcast data, thereby forming the data groups for digital broadcasting;

wherein the index data is repeatedly broadcast; and wherein said digital broadcasting receive apparatus comprises:

a data receiving means for receiving said digital broadcasting data groups;

a data storage means for storing said ordinary data and said index data separately from each other, obtained from the received digital broadcasting data;

an input means for receiving a request for downloading the broadcasting data;

a data control means for searching a storage location permitting downloading of broadcasting data, when said broadcasting data requested to be downloaded is not stored in said storage means, by referencing the index data corresponding to the requested broadcasting data, and for capturing the broadcasting data from said storage location through the network; and a distribution means for sending the data requested to be downloaded, to the requested destination.

2. A digital broadcasting system of claim 1, wherein said digital broadcasting transmission apparatus adds distinctive identifiers individually to said ordinary data and said index data.

3. A digital broadcasting system of claim 2, wherein said digital broadcasting receive apparatus is an information service station and has a data receiver for receiving said digital broadcasting contents, and a data memory means for storing said ordinary data and said index data separately among received data groups.

4. A digital broadcasting system of claim 1, wherein said digital broadcasting receive apparatus has a data separation means for identifying said ordinary data and said index data separately among the received data groups of digital broadcasting.

5. A digital broadcasting system of claim 4, wherein said digital broadcasting receive apparatus has a judge means for determining whether an original data are downloaded in the apparatus itself or not by referring to a data ID in said received index data.

6. A digital broadcasting system of claim 5, wherein said digital broadcasting receive apparatus is a mobile terminal, and has a download request means for allowing to select the necessity for downloading by displaying index data of an original data not downloaded yet.

7. A digital broadcasting system of claim 6, wherein said mobile terminal has a transmission means for putting out contents requested by said download request means, and a receive means for receiving digital broadcasting contents or download data selectively.

8. A digital broadcasting system of claim 7, wherein said transmission means of said mobile terminal adds and puts out said requested contents with a public-key used exclusively for an individual user or an individual terminal.

9. A digital broadcasting system of claim 1, wherein said digital broadcasting receive apparatus has a security management means for encrypting said download data by using a cipher key specified by said requester.

10. A digital broadcasting system of claim 1, wherein said digital broadcasting receive apparatus transmits a verification information for verifying a fact that said requester obtains an distributed information along with said download data, and acknowledges a response to said verification information, and processes a billing operation.

11. A digital broadcasting system of claim 1, wherein said digital broadcasting receive apparatus is an information service station and has a data receiver for receiving said digital broadcasting contents, and a data memory means for storing said ordinary data and said index data separately among received data groups.

* * * * *